(12) United States Patent
Shockency, Jr. et al.

(10) Patent No.: US 8,855,869 B2
(45) Date of Patent: Oct. 7, 2014

(54) DETERMINING A GROUND SPEED OF A MACHINE

(75) Inventors: Robert Shockency, Jr., Creve Coeur, IL (US); Eric Dishman, Peoria, IL (US); Erik Eddington, Bartonville, IL (US); Nathaniel Doy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 469 days.

(21) Appl. No.: 13/335,181

(22) Filed: Dec. 22, 2011

(65) Prior Publication Data

US 2013/0151086 A1 Jun. 13, 2013

Related U.S. Application Data

(63) Continuation-in-part of application No. 13/316,698, filed on Dec. 12, 2011.

(51) Int. Cl.
*G06F 19/00* (2011.01)
(52) U.S. Cl.
USPC .............................. 701/50; 701/93; 701/110
(58) Field of Classification Search
USPC ................ 701/50, 80, 93, 94, 102, 110, 65
See application file for complete search history.

(56) References Cited

U.S. PATENT DOCUMENTS

| | | | |
|---|---|---|---|
| 6,219,609 B1* | 4/2001 | Matsuno et al. | 701/72 |
| 6,564,140 B2* | 5/2003 | Ichikawa et al. | 701/91 |
| 7,676,314 B2* | 3/2010 | Kato et al. | 701/72 |
| 7,680,577 B2* | 3/2010 | Mori | 701/70 |
| 8,301,353 B2* | 10/2012 | Ono et al. | 701/90 |
| 2002/0045981 A1* | 4/2002 | Ichikawa et al. | 701/91 |
| 2008/0086248 A1* | 4/2008 | Lu et al. | 701/41 |
| 2011/0130926 A1* | 6/2011 | Lu et al. | 701/42 |

* cited by examiner

*Primary Examiner* — Ronnie Mancho
(74) *Attorney, Agent, or Firm* — Leonard Stewart

(57) ABSTRACT

The disclosure describes, in one aspect, a method for determining a machine ground speed. The method includes determining a machine speed from a position determining system, the machine speed includes a horizontal speed component and a vertical speed component, determining a direction the machine is moving at the machine speed, determining a machine inclination angle, determining a machine rate of inclination, and determining a compensated ground speed as a function of the horizontal speed component, the vertical speed component, the direction, the machine inclination angle, and the machine rate of inclination.

20 Claims, 4 Drawing Sheets

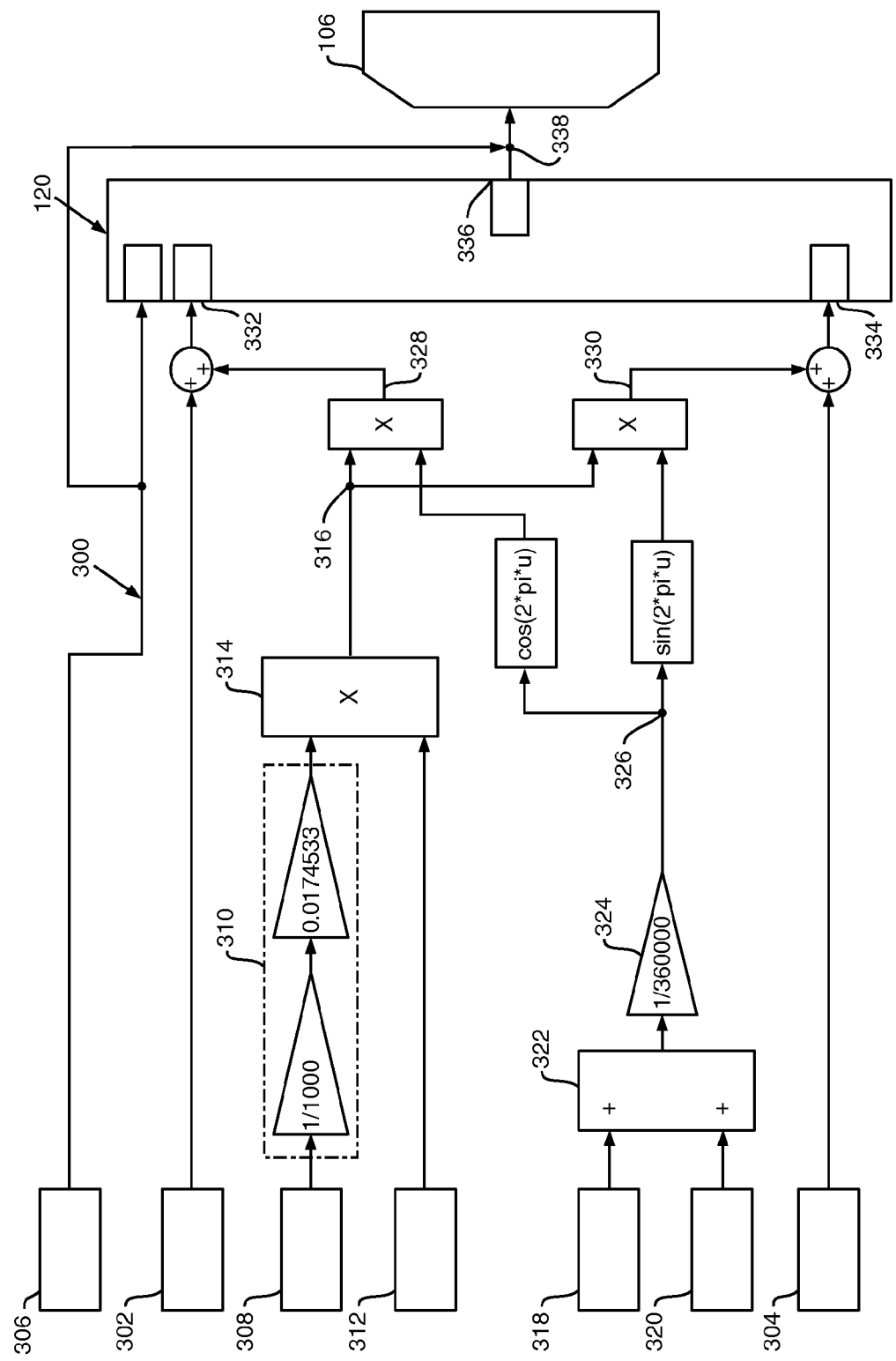

DETERMINING A GROUND SPEED OF A MACHINE

TECHNICAL FIELD

This patent disclosure relates generally to a control system, and more particularly to systems and methods for a control system adapted to determine and use a ground speed of a machine.

BACKGROUND

Earthmoving machines such as track type tractors, motor graders, scrapers, and/or backhoe loaders, have an implement such as a dozer blade or bucket, which is used on a worksite in order to alter a geography or terrain of a section of earth. The machine and/or the implement may be controlled by an operator or by a control system to perform work on the worksite such as achieving a final surface contour or a final grade on the worksite. Positioning the implement, however, is a complex and time-consuming task that requires expert skill and diligence if the operator is controlling the movement. Thus, it is often desirable to provide autonomous control of the machine and/or the implement to simplify operator control.

For autonomous control, it is sometimes necessary to determine the accurate ground speed of the machine to compare against a desired ground speed value for the control systems. Some machines use ground penetrating radar (GPR) and other ground based position systems to determine the ground speed. GPR components, however, are prone to failure, which may introduce errors in the ground speed determination and are often easily covered with dirt, which an operator must get out of machine, crawl under it, and remove the debris from the mounted radar. Further, radar components due to location can be damaged by rocks.

For example, U.S. Pat. No. 5,8640,480 to Jayaraman et al. ("Jayaraman") disclose a method for determining pitch and ground speed of an earth moving machine. Jayaraman discloses an automatic control system that includes a ground speed sensor that senses the ground speed of the earth moving machine and responsively produces a ground speed signal. Jayaraman teaches that the ground speed sensor is suitably positioned on the bulldozer and includes for example, a non-contacting ultrasonic or Doppler radar type sensor.

The disclosed systems and methods are directed to overcoming one or more of the problems set forth above.

SUMMARY

In one aspect, the disclosure describes, a method for determining a machine ground speed. The method includes determining a machine speed from a position determining system, the machine speed includes a horizontal speed component and a vertical speed component, determining a direction the machine is moving at the machine speed, determining a machine inclination angle, determining a machine rate of inclination, and determining a compensated ground speed as a function of the horizontal speed component, the vertical speed component, the direction, the machine inclination angle, and the machine rate of inclination.

BRIEF DESCRIPTION OF THE DRAWING(S)

FIG. 3 is a flow diagram illustrating an alternative embodiment of the control process in accordance with the present disclosure.

DETAILED DESCRIPTION

Figure 1:
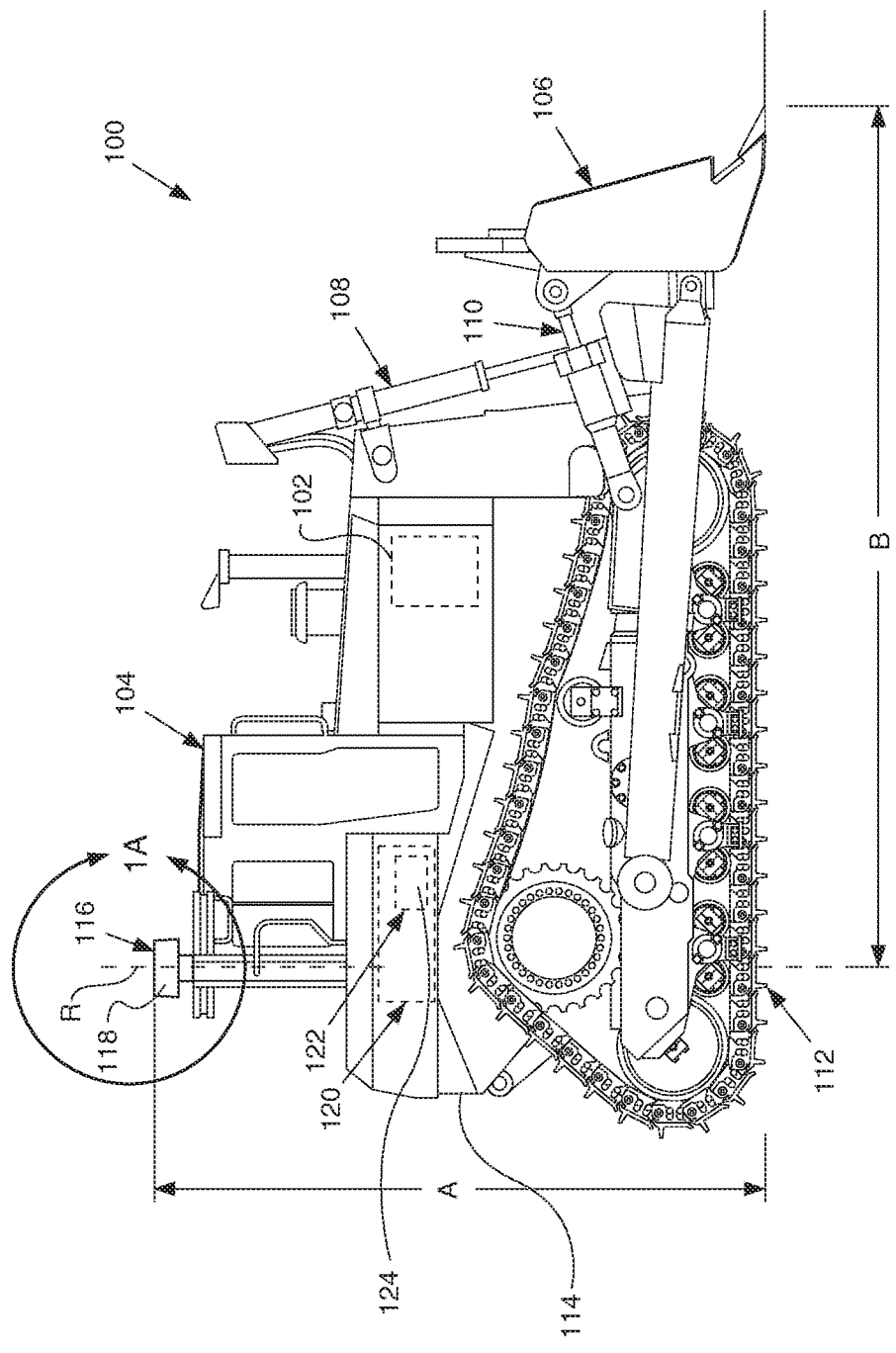
FIG. 1 illustrates a side view of a machine including a control system in accordance with an embodiment of the present disclosure.

This disclosure relates to systems and methods for determining a ground speed of a machine. An exemplary embodiment of a machine 100 is shown schematically in FIG. 1. The machine 100 may be a mobile machine that performs some type of operation associated with an industry such as mining, construction, farming, transportation, or any other industry known in the art. For example, the machine 100 may be a track-type tractor or dozer, as depicted in FIG. 1, a scraper, or any other machine known in the art. While the following exemplary embodiments are described in connection with a dozer, it should be appreciated that the description applies equally to the use of the embodiments in other machines.

In an illustrated embodiment, the machine 100 includes a power source 102, an operator's station or cab 104 containing controls necessary to operate the machine 100, such as, for example, one or more input devices (not shown) for propelling the machine 100 and/or controlling other machine components. The machine 100 further includes an implement 106, such as, for example, a blade, a bowl, a ripper, or a bucket for moving earth.

The one or more input devices may include one or more joysticks disposed within the cab 104 and may be adapted to receive input from an operator indicative of a desired movement of the implement 106. The cab 104 may also include a user interface having a display for conveying information to the operator and may include a keyboard, touch screen, or any suitable mechanism for receiving input from the operator to control and/or operate the machine 100, the implement 106, and/or the other machine components.

The implement 106 may be adapted to engage, penetrate, or cut the surface of a worksite and may be further adapted to move the earth to accomplish a predetermined task. The worksite may include, for example, a mine site, a landfill, a quarry, a construction site, or any other type of worksite. Moving the earth may be associated with altering the geography at the worksite and may include, for example, a grading operation, a scraping operation, a leveling operation, a bulk material removal operation, or any other type of geography altering operation at the worksite.

The implement 106 may be moveable by one or more hydraulic mechanisms operatively connected to the input device in the cab 104. The hydraulic mechanisms may include one or more hydraulic lift actuators 108 and one or more hydraulic tilt actuators 110 for moving the implement 106 in various positions, such as, for example, lifting the implement 106 up or lowering the implement 106 down, tilting the implement 106 left or right, or pitching the implement 106 forward or backward. In the illustrated embodiment, the machine 100 includes one hydraulic lift actuator 108 and one hydraulic tilt actuator 110 on each side of the implement 106 (only one side shown).

The power source 102 is an engine that provides power to ground engaging mechanisms 112 adapted to support, steer, and propel the machine 100. The power source 102 may embody an engine such as, for example, a diesel engine, a gasoline engine, a gaseous fuel-powered engine, or any other type of combustion engine known in the art. It is contemplated that the power source 102 may alternatively embody a non-combustion source of power (not shown) such as, for example, a fuel cell, a power storage device, or another suitable source of power. The power source 102 may produce a mechanical or electrical power output that may be converted to hydraulic power for providing power to the machine 100, the implement 106, and to other machine 100 components.

The machine 100 further includes a frame or rigid body 114 disposed between the implement 106 and the ground engaging mechanisms 112. A position determining system 116 adapted to receive and process position data or signals may be mounted to the rigid body 114 of the machine 100. The position determining system 116 may be mounted to the fixed body 114 of the machine 100 at a reference position R, which may be representative of an absolute position of the position determining system 116. In some embodiments, the position determining system 116 may be mounted on or proximate to the top of the cab 104 at a distance A relative to the bottom of the ground engaging mechanisms 112 and a distance B relative to the tip of the implement 106. The position determining system 116 may be a global position satellite (GPS) system or GPS receiver 118. The GPS system 118, as is well known in the art, receives signals from a plurality of satellites and responsively determines a position of a receiver in a coordinate system relative to the worksite, that is, in a site coordinate system. The site coordinate system may be a Cartesian system having an x-coordinate, a y-coordinate, and a z-coordinate.

In addition to position data, the GPS system 118 may be adapted to process a corresponding speed of the receiver 118. The corresponding speed may be used to determine the speed of travel of the machine 100; in other words, the GPS system 118 may be adapted to determine the travel speed or ground speed of the machine 100. In some embodiments, the GPS system 118 may determine a three-dimensional position, for example, latitude, longitude, and height, and may determine a three-dimensional speed, for example, northward, eastward, and vertical speeds.

In the illustrated embodiment, the GPS system 118 is adapted to provide a ground speed of the machine 100 that includes a horizontal velocity component and a vertical velocity component. The ground speed from the GPS system 118 may also include a magnitude that is determined by the square root of the sum of the squared horizontal and vertical velocity components. In alternative embodiments, the position determining system 116 may include other types of positioning systems mounted to the rigid body in a plurality of locations, such as, for example, inertial navigational systems (INSs), and may include a plurality of methods for determining a corresponding ground speed without departing from the scope of this disclosure.

The machine 100 may further include a control system 120 operatively connected to the input device and to the hydraulic actuators 108, 110 for controlling, for example, movement of the implement 106. In some embodiments, the control system 120 may be operatively connected to the input device and to other machine components for controlling other operations of the machine 100, such as, for example, connected to the ground engaging mechanisms 112 for controlling a speed of the machine 100. The control system 120 may direct the implement 106 to move to a predetermined or target position in response to an operators' desired movement of the implement 106 for engaging the implement 106 with the terrain of the worksite. The control system 120 may further direct the implement 106 to move to a predetermined or target position indicative of an automatically determined movement of the implement 106, based in part on, for example, an engineering or site design, a map, a productivity or load maximizing measure, or a combination of site design and productivity measure.

For precise control, such as, for example, to direct the implement 106 to move precisely in response to an automatically determined movement signal or command, the control system 120 may require certain predetermined or acquired data associated with the machine 100, such as, for example, the ground speed and/or the pitch of the machine 100. The control system 120 may include one or more sensors 122 operatively connected to or associated with the machine 100 for determining certain operational characteristics of the machine 100, such as, for example, an inclination or pitch rate sensor 124 for determining an angle, inclination, or pitch of the machine 100 and/or a rate of change associated with the angle, inclination, or pitch of the machine 100.

Figure 1A:
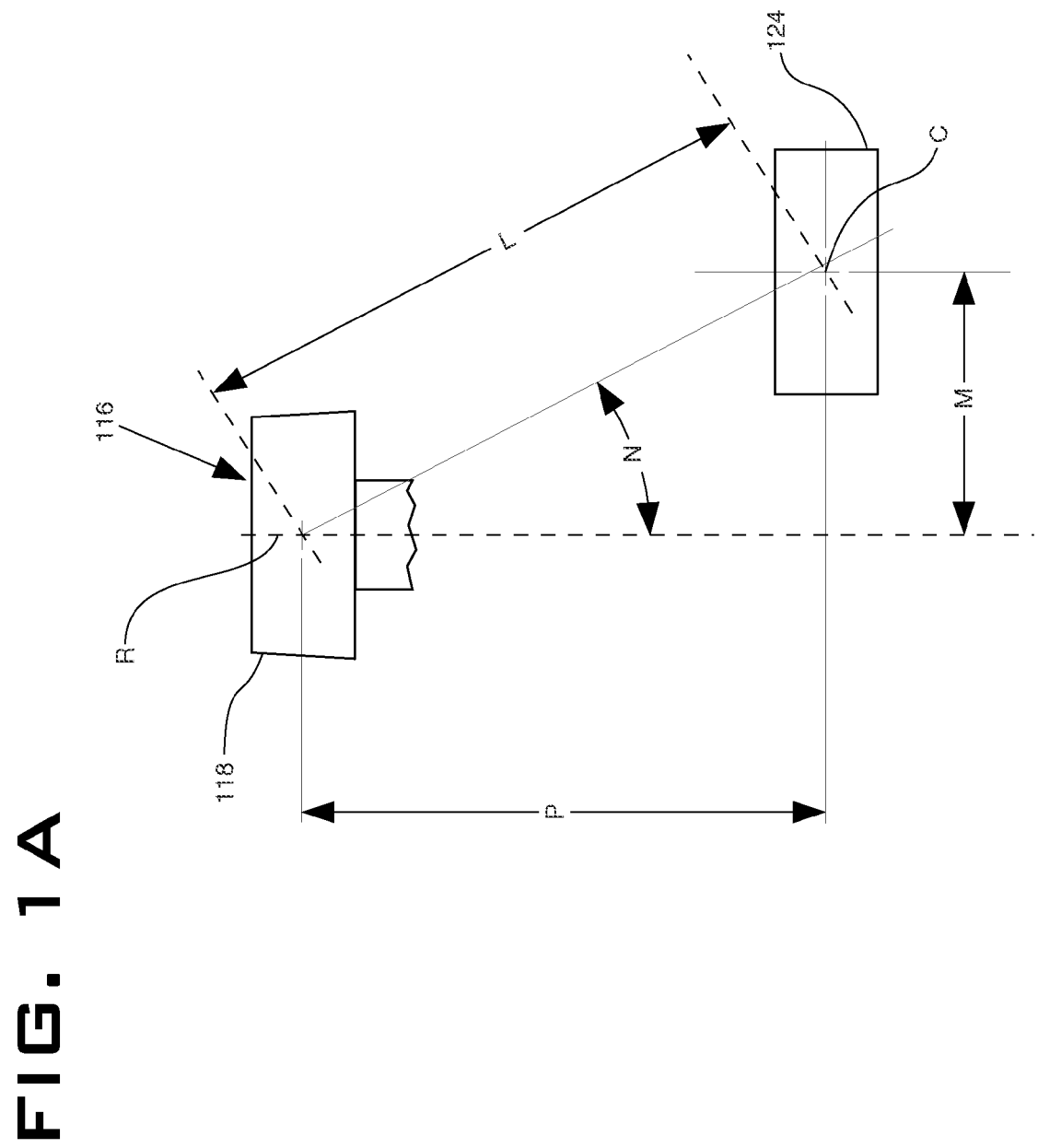

A location position C of the inclination sensor 124 may be operatively related to or associated with the reference position R of the GPS system 118. As shown in FIG. 1A, the reference position R of the GPS system 118 may be a linear distance L and an angular distance N from the inclination sensor 124. The positional relationship between the GPS system 118 and the inclination sensor 124 may be calculated or determined using trigometric and/or geometric methods based on the angle N and the vertical P and horizontal M components of the distance L. The inclination sensor 124 may also be located proximate to a pitch center of the machine 100, such as, for example, near a transmission case (not shown) of the machine 100. In some embodiments, the one or more sensors 122 may be embodied as an inertial measurement unit (IMU) in an INS that measures linear and rotational degrees of freedom, such as, for example, pitch, yaw, and roll.

The control system 120 may be adapted to receive inputs from the input device, the position determining system 116, and the sensors 122, 124. The control system 120 is further adapted to control or direct the movement of the implement 106 based at least in part on the inputs from the input device, the position determining system 116, and the sensors 122, 124. It is contemplated that the one or more sensors 122 may in alternative embodiments include appropriate sensors adapted for determining roll rates and/or yaw rates to provide a three dimensional representation of the orientation of the machine 100 to determine ground speed in accordance with this disclosure.

The control system 120 may include one or more control modules (e.g. ECMs, ECUs, etc.). The one or more control modules may include processing units, memory, sensor interfaces, and/or control signal interfaces (for receiving and transmitting signals). The processing units may represent one or more logic and/or processing components used by the control system 120 to perform certain communications, control, and/or diagnostic functions. For example, the processing units may be adapted to execute routing information among devices within and/or external to the control system 120.

Further, the processing units may be adapted to execute instructions, including from a storage device, such as memory. The one or more control modules may include a plurality of processing units, such as one or more general purpose processing units and or special purpose units (for example, ASICS, FPGAs, etc.). In certain embodiments, functionality of the processing unit may be embodied within an integrated microprocessor or microcontroller, including integrated CPU, memory, and one or more peripherals. The memory may represent one or more known systems capable of storing information, including, but not limited to, a random access memory (RAM), a read-only memory (ROM), magnetic and optical storage devices, disks, programmable, erasable components such as erasable programmable read-only memory (EPROM, EEPROM, etc.), and nonvolatile memory such as flash memory.

INDUSTRIAL APPLICABILITY

The industrial applicably of the systems and methods for determining a ground speed for the machine described herein will be readily appreciated from the foregoing discussion. Although the machine is shown as a track-type tractor, the machine may be any type of machine that performs at least one operation associated with, for example, mining, construction, and other industrial applications. Moreover, the systems and methods described herein can be adapted to a large variety of machines and tasks. For example, scrapers, backhoe loaders, skid steer loaders, wheel loaders, motor graders, and many other machines can benefit from the systems and methods described.

Figure 2:
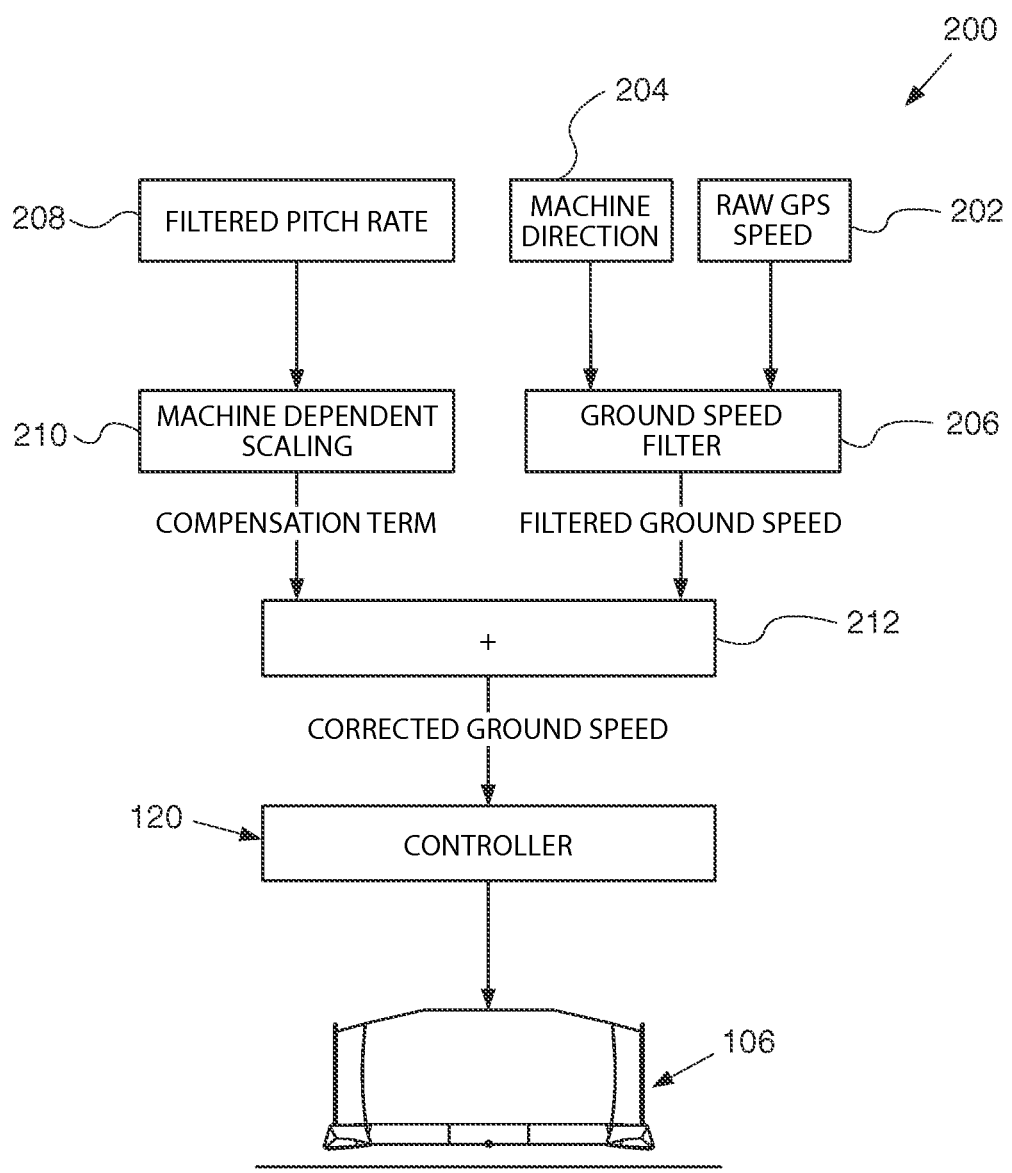
FIG. 2 is a flow diagram illustrating one embodiment of a control process in accordance with an embodiment of the present disclosure.

In accordance with certain embodiments, FIG. 2 illustrates an exemplary embodiment of the control system 120 and the process of determining the ground speed of the machine 100 (200). The control system 120 is adapted to receive a speed associated with the machine 100 from the GPS system 118 (Step 202). The GPS system 118 provides the speed of the machine 100 based in part on the speed at the GPS system 118 receiver mounted to the body 114 of the machine 100. The control system 120 is adapted to receive direction information associated with the direction in which the machine 100 is traveling (204). The speed information received from the GPS system 118 may be filtered, such as, for example, using a weighted moving average (Step 206).

In some embodiments, since the GPS system 118 is mounted to the body 114 of the machine 100, which may be on or near the top of the cab 104, the GPS system 118 receiver may be located at a significant distance away from the center of gravity of the machine 100. This distance away from the center of gravity may introduce errors when the speed is determined by the GPS system 118. The errors may be associated with or correlated with the pitch of the machine 100. Thus, the control system 120 is adapted to receive a pitch rate from the one or more sensors 122 embodied as the inclination sensor 124 (Step 208). In some embodiments, the pitch rate data or signal may be processed to eliminate noise and bias, such as, for example, using high pass and low pass filters.

Further, the distance the GPS system 118 is away from the center of gravity is a function of the size of the machine 100. Consequently, the magnitude of the error when determining the speed may be proportionate to the distance the GPS system 118 is away from the center of gravity. The control system 120 is adapted to determine a machine dependent scale factor for adjusting the speed determined by the GPS system 118 as a function of the pitch rate (Step 210). The factor may be determined from the following equation:

$$\text{factor} = \frac{\left(\frac{2\pi[\text{rad}]}{360[\text{deg}]}\right)\text{lever\_arm}[\text{mm}]}{1000\frac{[\text{mdeg}]}{[\text{deg}]}}$$

A pitch lever arm, or lever_arm in the above equation, which is essentially the distance L between the inclination sensor 124 and the GPS system 118 receiver, may approximate the distance the GPS system 118 is away from the center of gravity or the center of pitch. The above factor may be used to determine a scaled pitch rate compensation term, which is based in part on the size of machine 100, to be used for addressing the errors introduced by the GPS system 118 as discussed above. The scaled pitch rate compensation term and the filtered speed are summed to provide a corrected ground speed (Step 212). The control system 120 is adapted to receive the corrected ground speed and may use the corrected ground speed for more precise control, for example, of the implement 106 in response to an automatically determined movement signal or command. It is contemplated that the corrected ground speed may be used by the control system 120 to control other machine operations that require an accurate ground speed, such as, for example, to control the speed of the machine 100.

In accordance with an alternative embodiment, FIG. 3 illustrates an exemplary embodiment of the control system 120 and a process of determining a ground speed of the machine 100 when the ground speed includes a horizontal component and a vertical component (300). The control system 120 is configured to receive a horizontal ground speed component from the GPS system 118 (302). The control system 120 is further configured to receive a vertical speed component from the GPS system 118 (304). The control system 120 receives a direction signal or direction information (306). The direction information may be associated with a gear of a transmission (not shown) of the machine 100.

The control system 120 is further configured to receive a pitch rate from the inclination sensor 124 (308). The signal received from the inclination sensor 124 indicative of the pitch rate may be processed for filtering and unit conversion and for mathematical or statistical processing by the control system 120 (310). The control system 120 is configured to determine a machine dependent scale factor as a function of the relative distance L between the inclination sensor 124 and the GPS system 118 (312). The pitch lever arm distance L is discussed in more detail above. The control system 120 scales or multiplies (314) the pitch rate (308) by the scale factor (312) to determine a scaled pitch rate compensation parameter (316).

The control system 120 is further configured to receive a pitch signal associated with the machine 100 (318). In some embodiments, the pitch signal (318) may be processed or filtered, such as, for example, using a Kalman filter or any another linear quadratic or other such filter. The control system 120 determines a pitch lever angle factor as a function of the relative angle N between the inclination sensor 124 and the GPS system 118 (320). The pitch signal (318) and the pitch lever angle factor (320) are summed (322) and processed for unit conversion (324) to determine a pitch angle compensation parameter (326).

The control system 120 multiplies the pitch rate compensation parameter (316) by the cosine of two times pi times the pitch angle compensation parameter (326) to determine or calculate a horizontal compensation parameter (328). The control system 120 multiplies the pitch rate compensation parameter (316) by the sine of two times pi times the pitch angle compensation parameter (326) to determine or calculate a vertical compensation parameter (330). The horizontal compensation parameter (328) is added to the horizontal speed component (302) to determine the compensated horizontal speed (332). The vertical compensation parameter (330) is added to the vertical speed component (304) to determine the compensated vertical speed (334).

The control system 120 determines or calculates a compensated ground speed (336) as a function of the compensated horizontal speed (332) and the compensated vertical speed (334). In some embodiments, a magnitude of the compensated ground speed (336) is calculated or determined by the square root of the sum of the squared horizontal (332) and vertical compensated (334) speeds. In some embodiments, the direction of movement of the machine 100 is associated with the compensated horizontal speed (332) before and/or after the magnitude of the compensated ground speed (336) is determined (338). In addition, or alternatively, the control system 120 may be configured to filter or process the compensated horizontal speed (332) and the compensated vertical speed (334) individually or to filter or process the magnitude of the compensated ground speed (336). The control system 120 is adapted to receive the compensated ground speed (336) and may use the compensated ground speed (336) for more precise control, for example, of the implement 106 in response to an automatically determined movement signal or command. It is contemplated that the compensated ground speed (336) may be used by the control system 120 to control other machine operations that require an accurate ground speed.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for determining a machine ground speed, the method comprising:
    determining a machine speed from a position determining system, the machine speed includes a horizontal speed component and a vertical speed component;
    determining a direction the machine is moving at the machine speed;
    determining a machine inclination angle;
    determining a machine rate of inclination;
    determining a compensated ground speed as a function of the horizontal speed component, the vertical speed component, the direction, the machine inclination angle, and the machine rate of inclination.

2. The method of claim 1, wherein determining the compensated ground speed includes determining the compensated ground speed as a function of at least one of the horizontal speed component or a compensated horizontal speed and at least one of the vertical speed component or a compensated vertical speed.

3. The method of claim 1, wherein determining the compensated ground speed includes determining the compensated ground speed as a function of a compensated horizontal speed and a compensated vertical speed.

4. The method of claim 3, wherein determining the compensated horizontal speed includes determining the compensated horizontal speed as a function of the horizontal speed component and a horizontal compensation parameter.

5. The method of claim 4, wherein determining the compensated vertical speed includes determining the compensated vertical speed as a function of the vertical speed component and a vertical compensation parameter.

6. The method of claim 5, wherein determining the horizontal compensation parameter includes determining the horizontal compensation parameter as a function of a pitch rate compensation parameter and a pitch angle compensation parameter, and determining the vertical compensation parameter includes determining the vertical compensation parameter as a function of the pitch rate compensation parameter and the pitch angle compensation parameter.

7. The method of claim 6, wherein the pitch rate compensation parameter is determined as a function of the machine rate of inclination and a pitch lever arm, the pitch lever arm defines a distance between a component of the position determining system and a location of a pitch center of the machine.

8. The method of claim 7, wherein the pitch angle compensation parameter is determined as a function of the machine inclination angle and a pitch lever angle, the pitch lever angle defines an angle between the component of the position determining system and the location of the pitch center of the machine.

9. The method of claim 8, wherein determining the pitch rate compensation parameter includes multiplying the machine inclination rate and the pitch lever arm, and determining the pitch angle compensation parameter includes summing the machine inclination and the pitch lever angle.

10. The method of claim 9, wherein determining the horizontal compensation parameter includes multiplying the pitch rate compensation parameter and a cosine of the pitch angle compensation parameter.

11. The method of claim 10, wherein determining the vertical compensation parameter includes multiplying the pitch rate compensation parameter and a sine of the pitch angle compensation parameter.

12. An implement control system of a machine, the system comprising:
    a position determining system operatively connected to the machine;
    an inclination sensor operatively connected to the machine;
    a controller operatively connected to the implement, the position determining system, and the inclination sensor, the controller configured to:
        determine a machine speed from the position determining system, the machine speed includes a horizontal speed component and a vertical speed component;
        determine a direction the machine is moving at the machine speed;
        determine a machine inclination angle from the inclination sensor;
        determine a machine rate of inclination;
        determine a compensated ground speed as a function of the horizontal speed component, the vertical speed component, the direction, the machine inclination angle, and the machine rate of inclination; and
        control the implement based on the compensated ground speed.

13. The control system of claim 12, wherein the controller is further adapted to:

determine the compensated ground speed as a function of a compensated horizontal speed and a compensated vertical speed.

14. The control system of claim 13, wherein the compensated horizontal speed is determined as a function of the horizontal speed component and a horizontal compensation parameter and the compensated vertical speed is determined as a function of the vertical speed component and a vertical compensation parameter.

15. The control system of claim 14, wherein the horizontal compensation parameter is determined as a function of a pitch rate compensation parameter and a pitch angle compensation parameter, and the vertical compensation parameter is determined as a function of the pitch rate compensation parameter and the pitch angle compensation parameter.

16. The control system of claim 10, wherein the pitch rate compensation parameter is determined as a function of the machine rate of inclination and a pitch lever arm, the pitch lever arm defines a distance between a component of the position determining system and a location of a pitch center of the machine and the pitch angle compensation parameter is determined as a function of the machine inclination angle and a pitch lever angle, the pitch lever angle defines an angle between the component of the position determining system and the location of the pitch center of the machine.

17. The control system of claim 16, wherein the controller is further adapted to:
determine the pitch rate compensation parameter by multiplying the machine inclination rate and the pitch lever arm, and determining the pitch angle compensation parameter includes summing the machine inclination and the pitch lever angle.

18. The control system of claim 17, wherein the controller is further adapted to:
determine the horizontal compensation parameter by multiplying the pitch rate compensation parameter and a cosine of the pitch angle compensation parameter.

19. The control system of claim 18, wherein the controller is further adapted to:
determine the vertical compensation parameter by multiplying the pitch rate compensation parameter and a sine of the pitch angle compensation parameter.

20. A control system configured to control an implement based on a pitch rate compensated ground speed of a machine, the control system comprising:
a GPS system operatively connected to the machine at a first location, the first location is proximate to a top of a cab of the machine;
an inclination sensor operatively connected to the machine at a second location, the second location is proximate to a machine center of gravity;
a controller operatively connected to the implement, the GPS system, and the inclination sensor, the controller configured to:
determine a machine speed from the GPS system, the machine speed includes a horizontal speed component and a vertical speed component;
determine a direction the machine is moving at the machine speed;
determine a machine inclination angle from the inclination sensor;
determine a machine rate of inclination;
determine a compensated ground speed as a function of the direction, a compensated horizontal speed, and a compensated vertical speed, the compensated horizontal speed and the compensated vertical speed are functions of the horizontal speed component, the machine inclination angle, the machine rate of inclination, a pitch lever arm, and a pitch lever angle, the pitch lever arm defines a distance between the first location of the GPS system and the second location of the inclination sensor, the pitch lever angle defines an angle between the first location of the GPS system and the second location of the inclination sensor; and
control the implement based on the compensated ground speed.

* * * * *